(12) United States Patent
Phillips

(10) Patent No.: US 9,937,945 B1
(45) Date of Patent: Apr. 10, 2018

(54) COLLAPSIBLE STROLLER WITH BOUNCING SEAT

(71) Applicant: Kristy Phillips, Monticello, GA (US)

(72) Inventor: Kristy Phillips, Monticello, GA (US)

( * ) Notice: Subject to any disclaimer, the term of this patent is extended or adjusted under 35 U.S.C. 154(b) by 0 days.

(21) Appl. No.: 15/489,807

(22) Filed: Apr. 18, 2017

(51) Int. Cl.
B62B 3/00 (2006.01)
B62B 7/00 (2006.01)
B62B 7/08 (2006.01)
B62B 9/14 (2006.01)

(52) U.S. Cl.
CPC ............... B62B 7/004 (2013.01); B62B 7/08 (2013.01); B62B 9/147 (2013.01)

(58) Field of Classification Search
CPC .. B62B 9/147; B62B 9/00; B62B 9/10; B62B 9/102; B62B 9/12; B62B 9/14; B62B 9/142; B62B 9/245; B62B 7/004; B62B 7/08; B62B 7/00; B62B 7/06; B62B 7/04
See application file for complete search history.

(56) References Cited

U.S. PATENT DOCUMENTS

| | | | | |
|---|---|---|---|---|
| 2,415,146 A * | 2/1947 | Nanna | ...................... | A47D 1/06 280/47.371 |
| 2,712,451 A * | 7/1955 | Welsh | ...................... | B62B 9/10 280/47.4 |
| 3,084,949 A * | 4/1963 | Forster | ...................... | B62B 7/10 280/47.371 |
| 3,689,099 A * | 9/1972 | Patterson | ................... | B62B 7/08 280/38 |
| 3,759,539 A | 9/1973 | Goldberg | | |
| 4,045,045 A | 8/1977 | Boucher | | |
| 4,072,345 A * | 2/1978 | Matsuda | ................... | A47C 7/74 297/184.1 |
| 4,231,582 A | 11/1980 | Moss | | |
| 5,090,724 A * | 2/1992 | Fiore | ....................... | B62B 5/082 280/47.38 |
| 6,155,579 A * | 12/2000 | Eyman | .................. | B62B 5/0023 280/30 |
| 6,231,056 B1 * | 5/2001 | Wu | .......................... | A47D 1/02 280/1.188 |
| 6,585,284 B2 * | 7/2003 | Sweeney | ................... | B62B 9/28 280/33.993 |
| 6,910,709 B2 | 6/2005 | Chen | | |
| 7,025,364 B1 | 4/2006 | Clarke | | |
| 7,237,821 B2 | 7/2007 | Choi | | |
| 7,775,548 B2 * | 8/2010 | McIntyre | ................ | B62B 7/002 280/650 |
| 8,128,118 B2 * | 3/2012 | Friisdahl | ................... | B62B 7/12 280/47.38 |
| 8,590,919 B2 | 11/2013 | Yi | | |
| 8,746,794 B2 | 6/2014 | Oren | | |

(Continued)

FOREIGN PATENT DOCUMENTS

CN 203852108 U 3/2014

Primary Examiner — James M Dolak
(74) Attorney, Agent, or Firm — Kyle A. Fletcher, Esq.

(57) ABSTRACT

The collapsible stroller with bouncing seat comprises a frame, four sets of wheels, handles that extend upwards so that an adult can push the device, and a seating area that allows the seated child to push their feet against a surface for leg exercise and fun. In addition the collapsible stroller with bouncing seat comprises a play center, cup holder, a set of utility hooks, and a mesh storage bag. The collapsible stroller with bouncing seat collapses for easier storage when not in use.

10 Claims, 5 Drawing Sheets

(56) References Cited

U.S. PATENT DOCUMENTS

| | | | |
|---|---|---|---|
| 8,807,588 B2 * | 8/2014 | Thomas | B62B 7/14 280/47.4 |
| 9,365,231 B1 * | 6/2016 | Rajput | B62B 7/08 |
| 2006/0131840 A1 | 6/2006 | Donay | |

* cited by examiner

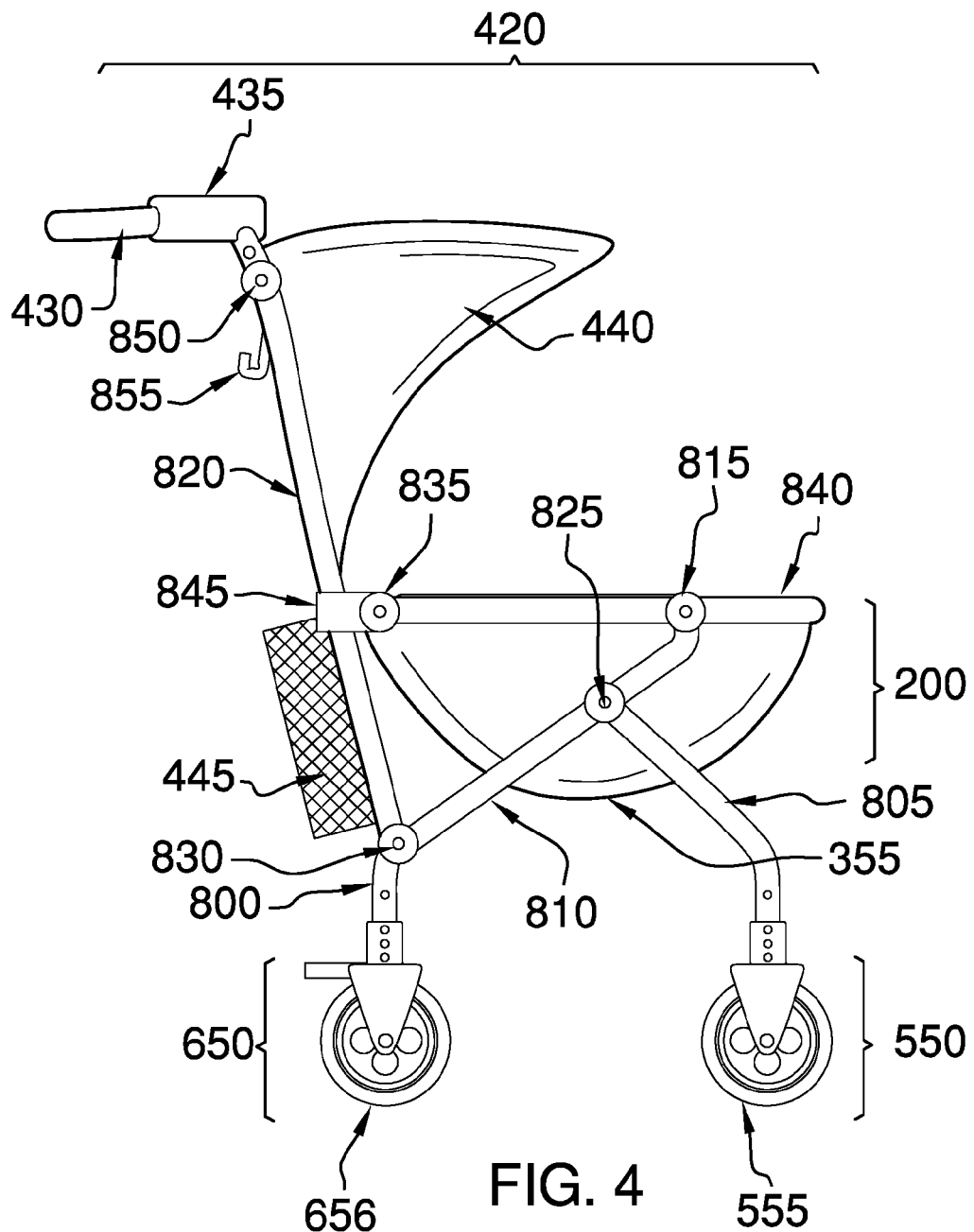

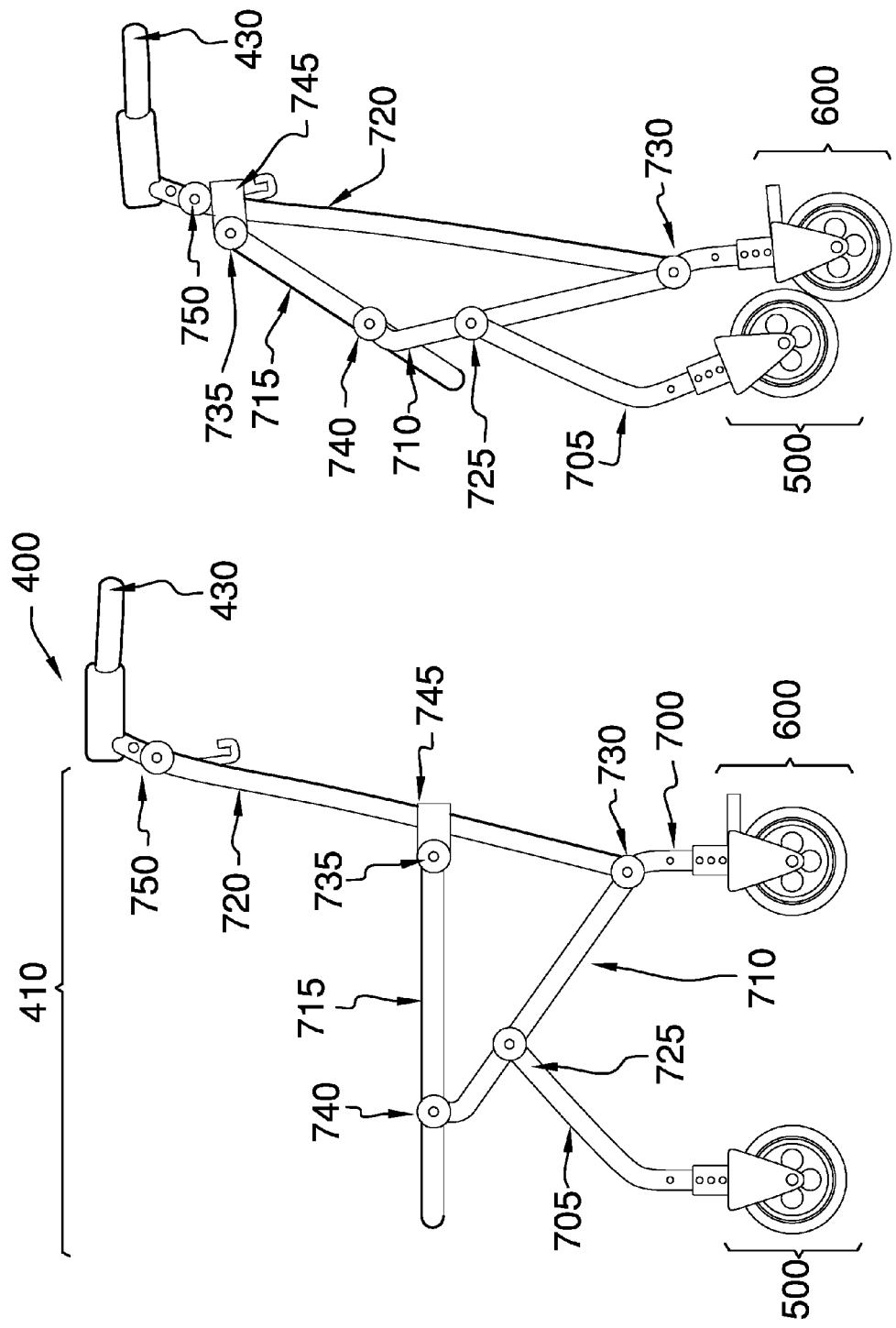

COLLAPSIBLE STROLLER WITH BOUNCING SEAT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of child carriers, more specifically, a stroller that comprises a bouncing seat.

SUMMARY OF INVENTION

The collapsible stroller with bouncing seat comprises a frame, four sets of wheels, handles that extend upwards so that an adult can push the device, and a seating area that allows the seated child to push their feet against a surface for leg exercise and fun. In addition the collapsible stroller with bouncing seat comprises a play center, cup holder, a set of utility hooks, and a mesh storage bag. The collapsible stroller with bouncing seat collapses for easier storage when not in use.

An object of the invention is to provide an easily moveable bouncing seat for a child.

A further object of the invention is to allow the collapsible stroller with bouncing to collapse for storage.

Yet another object of the invention is to provide entertainment and convenience features, such as a play center, cup holder, mesh storage bag, and utility hooks.

These together with additional objects, features and advantages of the collapsible stroller with bouncing seat will be readily apparent to those of ordinary skill in the art upon reading the following detailed description of the presently preferred, but nonetheless illustrative, embodiments when taken in conjunction with the accompanying drawings.

In this respect, before explaining the current embodiments of the collapsible stroller with bouncing seat in detail, it is to be understood that the collapsible stroller with bouncing seat is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the collapsible stroller with bouncing seat.

It is therefore important that the claims be regarded as including such equivalent construction insofar as they do not depart from the spirit and scope of the collapsible stroller with bouncing seat. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 4 is a right side view of an embodiment of the disclosure.

FIG. 5A is a left side view of an embodiment of the disclosure showing detail of the non-collapsed frame.

FIG. 5B is a left side view of an embodiment of the disclosure showing detail of the collapsed frame.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
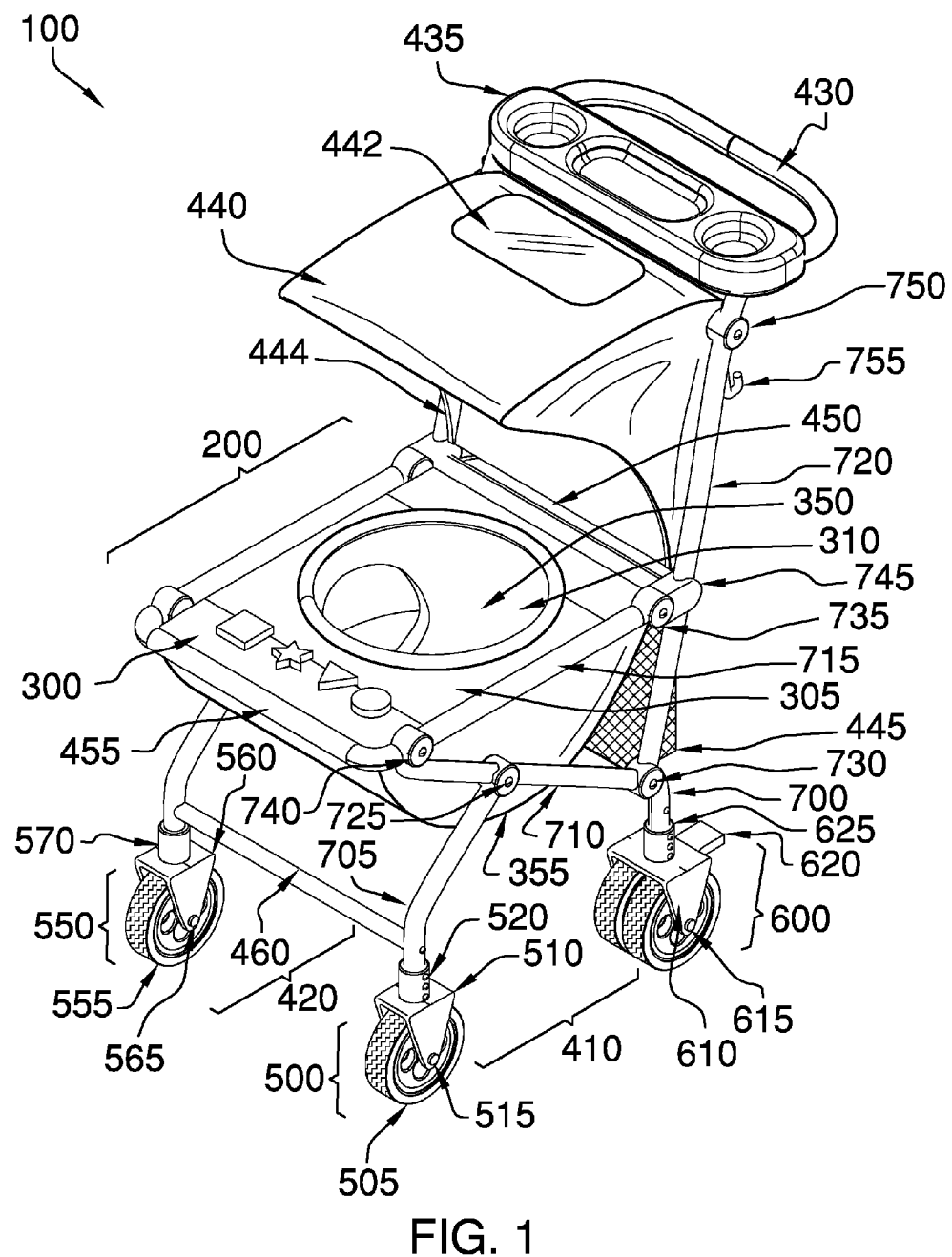
FIG. 1 is a perspective view of an embodiment of the disclosure.
Figure 2:
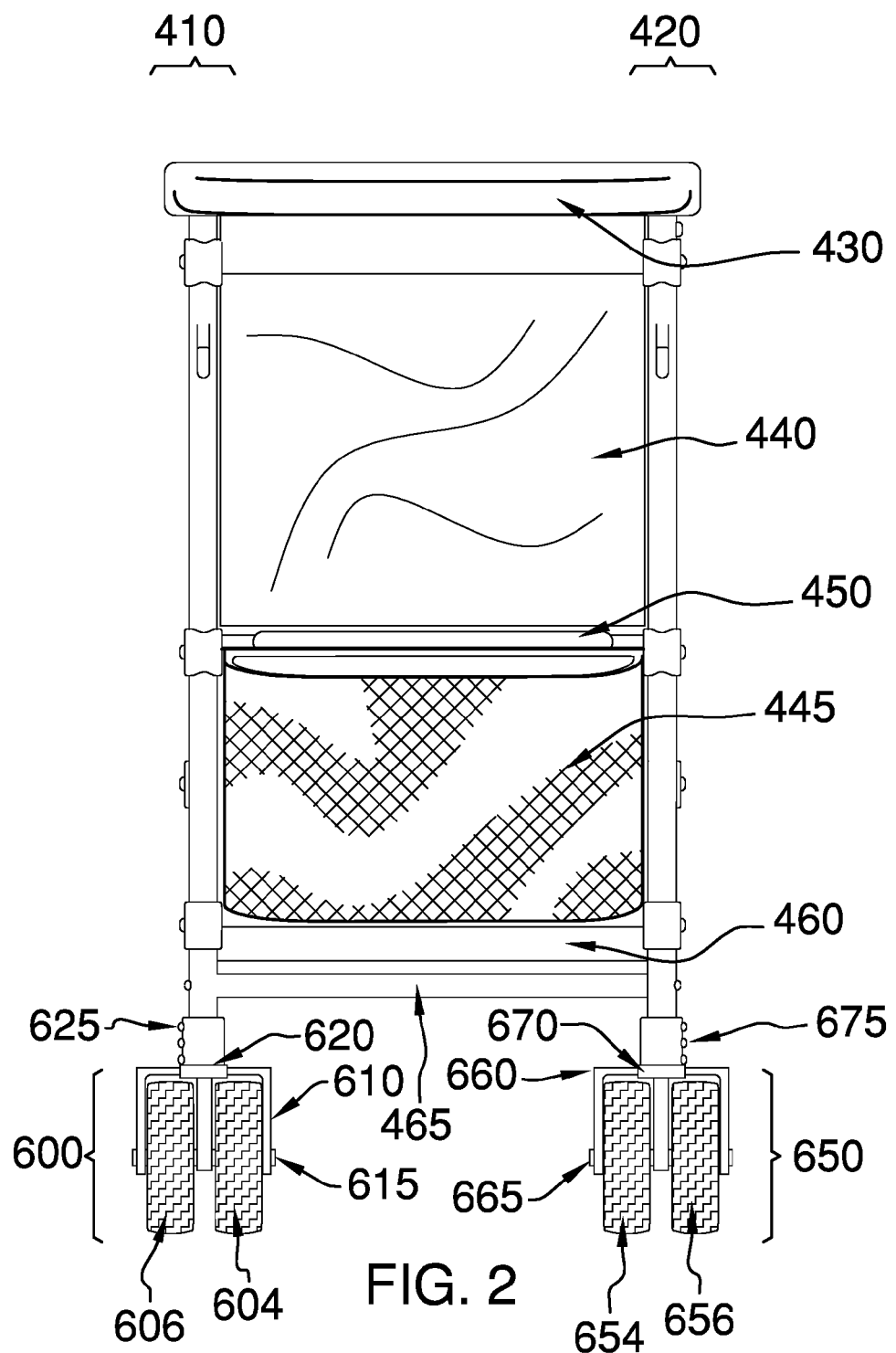
FIG. 2 is a back view of an embodiment of the disclosure.
Figure 3:
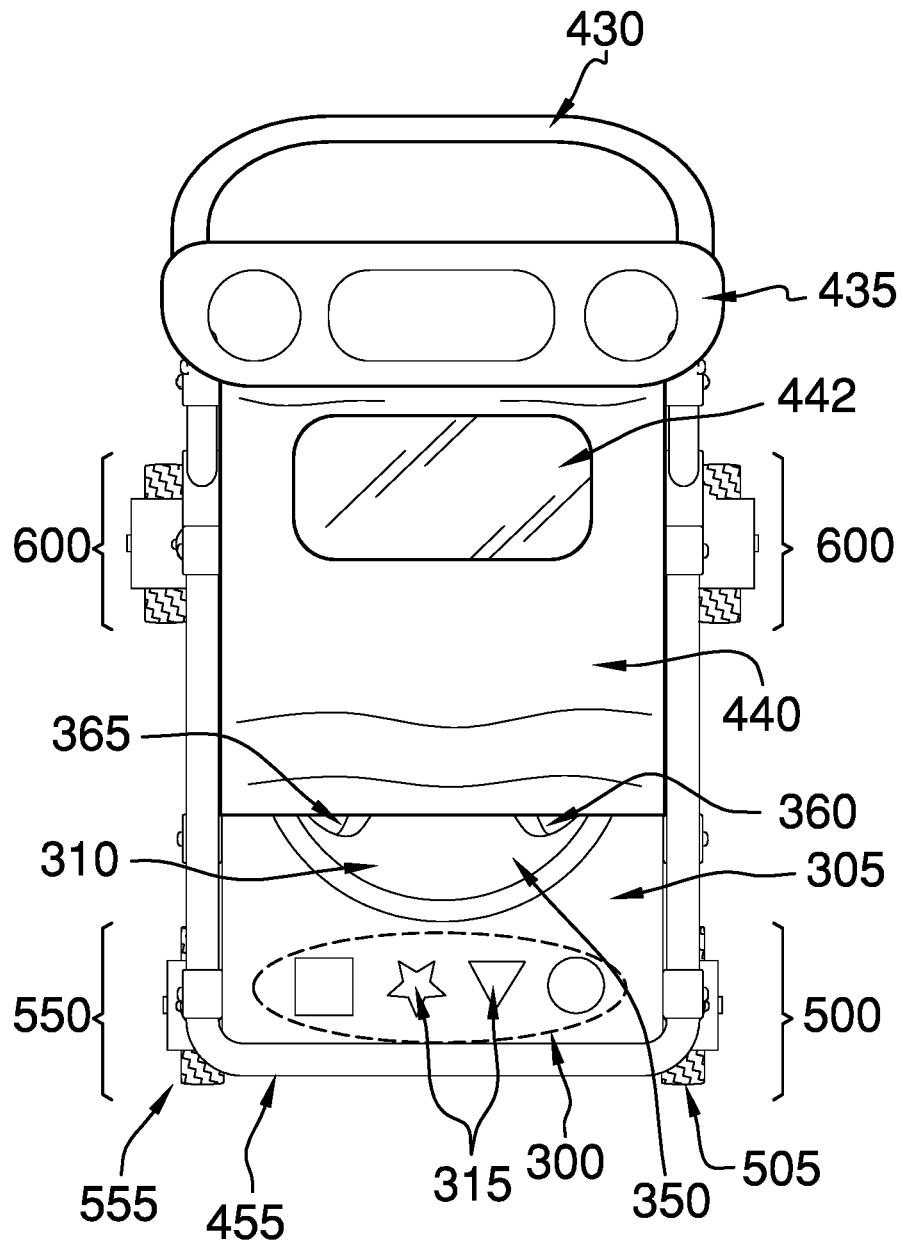
FIG. 3 is a top view of an embodiment of the disclosure.

Detailed reference will now be made to a first potential embodiment of the disclosure, which is illustrated in FIGS. 1 through 5B.

The collapsible stroller with bouncing seat 100 (hereinafter invention) comprises a seat assembly 200 and a collapsible frame 400. The seat assembly 200 holds a small child such as a toddler. The seat assembly 200 is situated in the invention 100 such that the child may touch and push against the ground or against a foot guard 355 with their feet. The collapsible frame 400 may collapse to a substantially flattened form when the invention 100 is not in use and therefore allows the invention 100 to be easily stored.

The seat assembly 200 comprises a play center 300, a seat platform 305, a suspended seat 350 and the foot guard 355. The play center 300 may provide activities to keep a child occupied while they are in the invention 100. The play center 300 comprises one or more tactile toys 315. The play center 300 connects to the seat platform 305. The one or more tactile toys 315 may provide objects with different shapes and colors. The one or more tactile toys 315 may spin, wiggle, push in, pull out, or perform other motions to stimulate a child's developing mind. The one or more tactile toys 315 pivotally couples to the seat platform 305. The seat platform 305 comprises a seat hole 310. The seat platform 305 serves as a mounting base for the play center 300 and as a support structure for the suspended seat 350. The seat hole 310 allows access to the suspended seat 350.

The suspended seat 350 hangs below the seat platform 305 and provides a seating area for a small child. The suspended seat 350 comprises a left leg hole 360, a right leg hole 365 and seat retention ring 320. The suspended seat 350 may be made of a flexible material. As non-limiting examples, the suspended seat 350 may be made from cloth, vinyl, rubber, other flexible materials, or a combination thereof. The left leg hole 360 and the right leg hole 365 provide a place for a child's legs to pass through so that the child can reach the floor or the foot guard 355. The seat retention ring 320 may comprise a means of retaining the suspended seat 350 in the seat platform 305. As a non-limiting example, the seat retention ring 320 may comprise a ring around the seat hole 310.

The foot guard 355 provides an area that a child's feet may push against while they are in the invention 100. The foot guard 355 is attached to the bottom side of the seat platform 305. In some embodiments, the foot guard 355 may be omitted and the child may be allowed to touch and push against the ground with their feet. In some embodiments, the foot guard 355 may be detachable from the seat platform 305 to allow use of the invention 100 with or without the foot guard 355.

The collapsible frame 400 comprises a handle 430, a cup holder 435, a shade 440, a mesh bag 445, a seat rear cross armature 450, a seat front cross armature 455, a front leg cross armature 460, a rear leg cross armature 465, a left side frame assembly 410 and a right side frame assembly 420. The handle 430 provides a convenient means for an adult to push the invention 100. In some embodiments, the handle 430 may rotate using a left handle hinge 750 and a right handle hinge 850 as pivot points to allow for easier storage when the invention 100 is collapsed. The cup holder 435 provides a convenient location for an adult to keep a cup, water bottle, toddler toys, and other items that may be needed on an outing with the child. The cup holder 435 connects to the handle 430. The shade 440 provides sun and rain protection for the child that occupies the invention 100. The shade 440 comprises a transparent window 442 and a shade support wire 444. The shade 440 attaches to a left upright armature 720 and a right upright armature 820.

In some embodiments, the shade 440 may collapse towards the left upright armature 720 and towards the right upright armature 820 by pivoting the shade support wire 444 using pivot points (not shown in the figures) at the base of each end of the shade support wire 444. The transparent window 442 allows an adult who is pushing the invention 100 to see and monitor the child that occupies the invention 100. The transparent window 442 connects to the shade 440. The shade support wire 444 may lie within the shade 440 and may run through a channel of the shade 440 that lies near the front edge of the top and sides of the shade 440. The shade support wire 444 provides a stiffening of the shade 440. The mesh bag 445 provides a storage area for toys, spare diapers, and other items that may be needed for use with a small child. The mesh bag 445 connects to the left upright armature 720 and the right upright armature 820.

A number of cross armatures help to provide side-to-side stability for the invention 100. The seat rear cross armature 450 attaches to a left slider hinge 735 and a right slider hinge 835. The seat front cross armature 455 attaches to a left seat armature 715 and a right seat armature 815. The front leg cross armature 460 attaches between a left front wheel armature 705 and a right front wheel armature 805. The rear leg cross armature 465 attaches to the left upright armature 720 and the right upright armature 820.

The left side frame assembly 410 comprises a left front wheel assembly 500, a left rear wheel assembly 600, a left rear wheel armature 700, the left front wheel armature 705, a left support armature 710, the left seat armature 715, the left upright armature 720, a left front leg hinge 725, a left support hinge 730, the left slider hinge 735, a left seat rotation hinge 740, a left slider 745, the left handle hinge 750 and a left hook 755.

The left front wheel assembly 500 comprises a left front wheel bracket 510, a left front axle 515, a left front wheel 505 and a left front height adjustment 520. The left front wheel bracket 510 may swivel to allow changes of direction. The left front wheel bracket 510 pivotally couples to the left front height adjustment 520. The left front axle 515 connects to the left front wheel bracket 510. The left front wheel bracket 510 couples to the left front axle 515 via mounting hardware not shown in the figures. The left front wheel 505 pivotally couples to the left front axle 515. The left front axle 515 couples to the left front wheel 505. The left front height adjustment 520 allows the height of the invention 100 to be adjusted up or down. As a non-limiting example, the left front height adjustment 520 may comprise one or more holes on the left front height adjustment 520, which engage with a spring-loaded pin on the left front wheel armature 705. When the spring-loaded pin is aligned with the one or more holes the spring-loaded pin is thrust outward into the one or more holes, thus locking the height. To adjust the height, the spring-loaded pin is pushed in until it clears the one or more holes and then the left front wheel assembly 500 is moved up or down. The left front height adjustment 520 slidably couples to the left front wheel armature 705.

The left rear wheel assembly 600 comprises a left rear inner wheel 604, a left rear outer wheel 606, a left rear wheel bracket 610, a left rear axle 615, a left rear brake 620 and a left rear height adjustment 625. The left rear inner wheel 604 pivotally couples to the left rear axle 615. The left rear outer wheel 606 pivotally couples to the left rear axle 615. The left rear wheel bracket 610 connects to the left rear height adjustment 625. The left rear axle 615 connects to the left rear wheel bracket 610. The left rear wheel bracket 610 couples to the left rear axle 615 via mounting hardware not shown in the figures. Pressing down on the rear of the left rear brake 620 causes it to pivot and to come in contact with the left rear inner wheel 604 and the left rear outer wheel 606. By contacting the left rear inner wheel 604 and the left rear outer wheel 606, the left rear brake 620 causes the left rear inner wheel 604 and the left rear outer wheel 606 to lock in place and prevents movement of the invention 100. The left rear brake 620 pivotally couples to the left rear wheel bracket 610. The left rear height adjustment 625 allows the height of the invention 100 to be adjusted up or down.

As a non-limiting example, the left rear height adjustment 625 may comprise one or more holes on the left rear height adjustment 625, which engage with a spring-loaded pin on the left rear wheel armature 700. When the spring-loaded pin is aligned with the one or more holes the spring-loaded pin is thrust outward into the one or more holes, thus locking the height. To adjust the height, the spring-loaded pin is pushed in until it clears the one or more holes and then the left rear wheel assembly 600 is moved up or down. The left rear height adjustment 625 slidably couples to the left rear wheel armature 700.

The left rear wheel armature 700 connects the left rear wheel assembly 600 and the left support hinge 730. The left rear wheel assembly 600 couples to the left rear wheel armature 700 via the left rear height adjustment 625. The left front wheel armature 705 connects to the left front wheel assembly 500 via the left front height adjustment 520. The left front wheel armature 705 pivotally couples to the left front leg hinge 725. The left support armature 710 provides support for the weight of the seat assembly 200 on the left side of the invention 100. The left seat armature 715 serves as an attachment point for the seat assembly 200. The left upright armature 720 connects to the left handle hinge 750. The left front leg hinge 725 pivotally couples the left front wheel armature 705 and the left support armature 710. The left support hinge 730 connects the left rear wheel armature 700 to the left upright armature 720. The left support hinge 730 pivotally couples to the left support armature 710. The left slider hinge 735 connects to the left seat armature 715. The left slider hinge 735 pivotally couples to the left slider 745. The left seat rotation hinge 740 is connected to the left support armature 710. The left seat rotation hinge 740 pivotally couples to the left seat armature 715.

When the invention 100 is collapsed or opened, the left seat armature 715 pivots relative to the left support armature 710 using the left seat rotation hinge 740 as a pivot point. As a result, the left slider 745 moves along the left upright armature 720. As the left slider 745 moves along the left upright armature 720, the angle between the left seat armature 715 and the left upright armature 720 must change. To accomplish this, the left slider 745 pivots relative to the left seat armature 715 using the left slider hinge 735 as a pivot point. The left slider 745 pivotally couples to the left slider hinge 735. The left handle hinge 750 pivotally couples the left upright armature 720 and the handle 430. The left hook 755 and a right hook 855 together provide a means of hanging a small bag or other items from the back of the invention 100. The left hook 755 attaches to the left upright armature 720.

The right side frame assembly 420 comprises a right front wheel assembly 550, a right rear wheel assembly 650, a right rear wheel armature 800, the right front wheel armature 805, a right support armature 810, the right seat armature 815, the right upright armature 820, a right front leg hinge 825, a right support hinge 830, the right slider hinge 835, a right seat rotation hinge 840, a right slider 845, the right handle hinge 850 and the right hook 855.

The right front wheel assembly 550 comprises a right front wheel bracket 560, a right front axle 565, a right front wheel 555 and a right front height adjustment 570. The right front wheel bracket 560 may swivel to allow changes of direction. The right front wheel bracket 560 pivotally couples to the right front height adjustment 570. The right front axle 565 connects to the right front wheel bracket 560. The right front wheel bracket 560 couples to the right front axle 565 via mounting hardware not shown in the figures. The right front wheel 555 pivotally couples to the right front axle 565. The right front height adjustment 570 allows the height of the invention 100 to be adjusted up or down.

As a non-limiting example, the right front height adjustment 570 may comprise one or more holes on the right front height adjustment 570, which engage with a spring-loaded pin on the right front wheel armature 805. When the spring-loaded pin is aligned with the one or more holes the spring-loaded pin is thrust outward into the one or more holes, thus locking the height. To adjust the height, the spring-loaded pin is pushed in until it clears the one or more holes and then the right front wheel assembly 550 is moved up or down. The right front height adjustment 570 slidably couples to the right front wheel armature 805.

The right rear wheel assembly 650 comprises a right rear inner wheel 654, a right rear outer wheel 656, a right rear wheel bracket 660, a right rear axle 665, a right rear brake 670 and a right rear height adjustment 675. The right rear inner wheel 654 pivotally couples to the right rear axle 665. The right rear outer wheel 656 pivotally couples to the right rear axle 665. The right rear wheel bracket 660 connects to the right rear height adjustment 675. The right rear axle 665 connects to the right rear wheel bracket 660. The right rear wheel bracket 660 couples to the right rear axle 665 via mounting hardware not shown in the figures. Pressing down on the rear of the right rear brake 670 causes it to pivot and to come in contact with the right rear inner wheel 654 and the right rear outer wheel 656. By contacting the right rear inner wheel 654 and the right rear outer wheel 656, the right rear brake 670 causes the right rear inner wheel 654 and the right rear outer wheel 656 to lock in place and prevents movement of the invention 100. The right rear brake 670 pivotally couples to the right rear wheel bracket 660. The right rear height adjustment 675 allows the height of the invention 100 to be adjusted up or down.

As a non-limiting example, the right rear height adjustment 675 may comprise one or more holes on the right rear height adjustment 675, which engage with a spring-loaded pin on the right rear wheel armature 800. When the spring-loaded pin is aligned with the one or more holes the spring-loaded pin is thrust outward into the one or more holes, thus locking the height. To adjust the height, the spring-loaded pin is pushed in until it clears the one or more holes and then the right rear wheel assembly 650 is moved up or down. The right rear height adjustment 675 slidably couples to the right rear wheel armature 800.

The right rear wheel armature 800 connects the right rear wheel assembly 650 and the right support hinge 830. The right rear wheel assembly 650 couples to the right rear wheel armature 800 via the right rear height adjustment 675. The right front wheel armature 805 connects to the right front wheel assembly 550 via the right front height adjustment 570. The right front wheel armature 805 pivotally couples to the right front leg hinge 825. The right support armature 810 provides support for the weight of the seat assembly 200 on the right side of the invention 100. The right upright armature 820 connects to the right handle hinge 850. The right front leg hinge 825 pivotally couples the right front wheel armature 805 and the right support armature 810. The right support hinge 830 connects the right rear wheel armature 800 to the right upright armature 820. The right support hinge 830 pivotally couples to the right support armature 810. The right slider hinge 835 connects to the right seat armature 815. The right slider hinge 835 pivotally couples to the right slider 845. The right seat rotation hinge 840 is connected to the right support armature 810. The right seat rotation hinge 840 pivotally couples to the right seat armature 815.

When the invention 100 is collapsed or opened, the right seat armature 815 pivots relative to the right support armature 810 using the right seat rotation hinge 840 as a pivot point. As a result, the right slider 845 moves along the right upright armature 820. As the right slider 845 moves along the right upright armature 820, the angle between the right seat armature 815 and the right upright armature 820 must change. To accomplish this, the right slider 845 pivots relative to the right seat armature 815 using the right slider hinge 835 as a pivot point. The right slider 845 pivotally couples to the right slider hinge 835. The right handle hinge 850 pivotally couples the right upright armature 820 and the handle 430. The right hook 855 attaches to the right upright armature 820.

With respect to the above description, it is to be realized that the optimum dimensional relationship for the various components of the invention described above and in FIGS. 1 through 5B, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A collapsible stroller with a bouncing seat comprising:
a seat assembly and a collapsible frame;
wherein the seat assembly is adapted to hold a child;
wherein the seat assembly is adapted to be situated such that the child is adapted to push their feet against a foot guard;
wherein the collapsible frame collapses to a substantially flattened form when not in use;
wherein the seat assembly comprises a play center, a seat platform, a suspended seat and the foot guard;
wherein the play center is adapted to provide activities for the child occupied while in the collapsible stroller with bouncing seat;
wherein the play center comprises one or more tactile toys;
wherein the play center connects to the seat platform;
wherein the one or more tactile toys pivotally couples to the seat platform;
wherein the seat platform comprises a seat hole;
wherein the seat platform serves as a mounting base for the play center and as a support structure for the suspended seat;
wherein the seat hole allows access to the suspended seat;
wherein the suspended seat hangs below the seat platform;
wherein the suspended seat is adapted to provide a seating area for said child;
wherein the suspended seat comprises a left leg hole, a right leg hole and seat retention ring;
wherein the suspended seat is made of a flexible material;
wherein the left leg hole and the right leg hole are each adapted to provide a place for legs of the child to pass through so that the child can adaptively reach the foot guard;
wherein the seat retention ring retains the suspended seat in the seat platform;
wherein the foot guard is adapted to provide an area that a child's feet pushes against while said child is in the collapsible stroller with bouncing seat;
wherein the foot guard is attached to the bottom side of the seat platform;
wherein the foot guard is detachable from the seat platform to allow use of the collapsible stroller with bouncing seat without the foot guard;
wherein the collapsible frame comprises a handle, a cup holder, a shade, a mesh bag, a seat rear cross armature, a seat front cross armature, a front leg cross armature, a rear leg cross armature, a left side frame assembly and a right side frame assembly;
wherein the handle allows an adult to push the collapsible stroller with bouncing seat;
wherein the handle rotates using a left handle hinge and a right handle hinge as pivot points to allow for easier storage when the collapsible stroller with bouncing seat is collapsed;
wherein the cup holder is adapted to provide a location to keep items that are associated with an outing with said child;
wherein the cup holder connects to the handle;
wherein the shade is adapted to provide sun and rain protection for the child that occupies the collapsible stroller with bouncing seat;
wherein the shade comprises a transparent window and a shade support wire;
wherein the shade attaches to a left upright armature and a right upright armature;
wherein the shade collapses towards the left upright armature and towards the right upright armature via pivoting the shade support wire using pivot points at the base of each end of the shade support wire;
wherein the transparent window is adapted to allow an adult who is pushing the collapsible stroller with bouncing seat to see and monitor the child that occupies the collapsible stroller with bouncing seat;
wherein the transparent window connects to the shade;
wherein the shade support wire lies within the shade and runs through a channel of the shade that lies at the front edge of the top and sides of the shade;
wherein the shade support wire provides a stiffening of the shade;
wherein the mesh bag provides a storage area for toys, spare diapers, and other items that are needed for use with said child;
wherein the mesh bag connects to the left upright armature and the right upright armature;
wherein the seat rear cross armature attaches to a left slider hinge and a right slider hinge;
wherein the seat front cross armature attaches to a left seat armature and a right seat armature;
wherein the front leg cross armature attaches to a left front wheel armature and a right front wheel armature;
wherein the rear leg cross armature attaches to the left upright armature and the right upright armature;
wherein the left front wheel assembly comprises a left front wheel bracket, a left front axle, a left front wheel and a left front height adjustment;
wherein the left front wheel bracket swivels to allow changes of direction;
wherein the left front wheel bracket pivotally couples to the left front height adjustment;
wherein the left front axle connects to the left front wheel bracket;
wherein the left front wheel pivotally couples to the left front axle;
wherein the left front axle couples to the left front wheel;
wherein the left front height adjustment allows the height of the collapsible stroller with bouncing seat to be adjusted up or down.

2. The collapsible stroller with bouncing seat according to claim 1
wherein the left rear wheel assembly comprises a left rear inner wheel, a left rear outer wheel, a left rear wheel bracket, a left rear axle, a left rear brake and a left rear height adjustment;
wherein the left rear inner wheel pivotally couples to the left rear axle;
wherein the left rear outer wheel pivotally couples to the left rear axle;

wherein the left rear wheel bracket connects to the left rear height adjustment;

wherein the left rear axle connects to the left rear wheel bracket.

3. The collapsible stroller with bouncing seat according to claim 2 wherein pressing down on the rear of the left rear brake causes it to pivot and to come in contact with the left rear inner wheel and the left rear outer wheel;

wherein by contacting the left rear inner wheel and the left rear outer wheel, the left rear brake causes the left rear inner wheel and the left rear outer wheel to lock in place and prevents movement of the collapsible stroller with bouncing seat;

wherein the left rear brake pivotally couples to the left rear wheel bracket;

wherein the left rear height adjustment allows the height of the collapsible stroller with bouncing seat to be adjusted up or down.

4. The collapsible stroller with bouncing seat according to claim 3 wherein the left side frame assembly comprises a left front wheel assembly, a left rear wheel assembly, a left rear wheel armature, the left front wheel armature, a left support armature, the left seat armature, the left upright armature, a left front leg hinge, a left support hinge, the left slider hinge, a left seat rotation hinge, a left slider, the left handle hinge and a left hook;

wherein the left rear wheel armature connects the left rear wheel assembly and the left support hinge;

wherein the left rear wheel assembly couples to the left rear wheel armature via the left rear height adjustment;

wherein the left front wheel armature connects to the left front wheel assembly via the left front height adjustment;

wherein the left front wheel armature pivotally couples to the left front leg hinge;

wherein the left support armature provides support for the weight of the seat assembly on the left side of the collapsible stroller with bouncing seat;

wherein the left seat armature serves as an attachment point for the seat assembly;

wherein the left upright armature connects to the left handle hinge;

wherein the left front leg hinge pivotally couples the left front wheel armature and the left support armature;

wherein the left support hinge connects the left rear wheel armature to the left upright armature;

wherein the left support hinge pivotally couples to the left support armature;

wherein the left slider hinge connects to the left seat armature;

wherein the left slider hinge pivotally couples to the left slider;

wherein the left seat rotation hinge is connected to the left support armature.

5. The collapsible stroller with bouncing seat according to claim 4 wherein the left seat rotation hinge pivotally couples to the left seat armature;

wherein the left seat armature pivots relative to the left support armature using the left seat rotation hinge as a pivot point;

wherein the left handle hinge pivotally couples the left upright armature and the handle;

wherein the left hook and a right hook together provide a means of hanging a small bag or other items from the back of the collapsible stroller with bouncing seat;

wherein the left hook attaches to the left upright armature.

6. The collapsible stroller with bouncing seat according to claim 5 wherein the right front wheel assembly comprises a right front wheel bracket, a right front axle, a right front wheel and a right front height adjustment;

wherein the right front wheel bracket swivels to allow changes of direction;

wherein the right front wheel bracket pivotally couples to the right front height adjustment;

wherein the right front axle connects to the right front wheel bracket;

wherein the right front wheel pivotally couples to the right front axle;

wherein the right front height adjustment allows the height of the collapsible stroller with bouncing seat to be adjusted up or down.

7. The collapsible stroller with bouncing seat according to claim 6 wherein the right rear wheel assembly comprises a right rear inner wheel, a right rear outer wheel, a right rear wheel bracket, a right rear axle, a right rear brake and a right rear height adjustment;

wherein the right rear inner wheel pivotally couples to the right rear axle;

wherein the right rear outer wheel pivotally couples to the right rear axle;

wherein the right rear wheel bracket connects to the right rear height adjustment;

wherein the right rear axle connects to the right rear wheel bracket.

8. The collapsible stroller with bouncing seat according to claim 7 wherein pressing down on the rear of the right rear brake causes it to pivot and to come in contact with the right rear inner wheel and the right rear outer wheel;

wherein by contacting the right rear inner wheel and the right rear outer wheel, the right rear brake causes the right rear inner wheel and the right rear outer wheel to lock in place and prevents movement of the collapsible stroller with bouncing seat;

wherein the right rear brake pivotally couples to the right rear wheel bracket;

wherein the right rear height adjustment allows the height of the collapsible stroller with bouncing seat to be adjusted up or down.

9. The collapsible stroller with bouncing seat according to claim 8 wherein the right side frame assembly comprises a right front wheel assembly, a right rear wheel assembly, a right rear wheel armature, the right front wheel armature, a right support armature, the right seat armature, the right upright armature, a right front leg hinge, a right support hinge, the right slider hinge, a right seat rotation hinge, a right slider, the right handle hinge and the right hook;

wherein the right rear wheel armature connects the right rear wheel assembly and the right support hinge;

wherein the right rear wheel assembly couples to the right rear wheel armature via the right rear height adjustment;

wherein the right front wheel armature connects to the right front wheel assembly via the right front height adjustment;

wherein the right front wheel armature pivotally couples to the right front leg hinge;

wherein the right support armature provides support for the weight of the seat assembly on the right side of the collapsible stroller with bouncing seat;

wherein the right upright armature connects to the right handle hinge;

wherein the right front leg hinge pivotally couples the right front wheel armature and the right support armature;

wherein the right support hinge connects the right rear wheel armature to the right upright armature;

wherein the right support hinge pivotally couples to the right support armature;

wherein the right slider hinge connects to the right seat armature;

wherein the right slider hinge pivotally couples to the right slider.

10. The collapsible stroller with bouncing seat according to claim 9 wherein the right seat rotation hinge is connected to the right support armature;

wherein the right seat rotation hinge pivotally couples to the right seat armature;

wherein the right slider pivots relative to the right seat armature using the right slider hinge as a pivot point;

wherein the right slider pivotally couples to the right slider hinge;

wherein the right handle hinge pivotally couples the right upright armature and the handle;

wherein the right hook attaches to the right upright armature.

* * * * *